US012808974B2

(12) United States Patent
Peng et al.

(10) Patent No.: US 12,808,974 B2
(45) Date of Patent: Nov. 24, 2026

(54) POSITIONING WITH CARRIER PHASE

(71) Applicant: ZTE Corporation, Shenzhen (CN)

(72) Inventors: Focai Peng, Shenzhen (CN); Chuangxin Jiang, Shenzhen (CN); Zhaohua Lu, Shenzhen (CN); Qi Yang, Shenzhen (CN); Mengzhen Li, Shenzhen (CN); Xianghui Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 280 days.

(21) Appl. No.: 18/734,142

(22) Filed: Jun. 5, 2024

(65) Prior Publication Data

US 2025/0130305 A1 Apr. 24, 2025

Related U.S. Application Data

(63) Continuation of application No. PCT/CN2022/106068, filed on Jul. 15, 2022.

(51) Int. Cl.

| | |
|---|---|
| ***H04W 24/10*** | (2009.01) |
| ***G01S 5/00*** | (2006.01) |
| ***G01S 5/02*** | (2010.01) |
| ***G01S 5/10*** | (2006.01) |
| ***H04L 5/00*** | (2006.01) |

(52) U.S. Cl.

CPC .............. *G01S 5/10* (2013.01); *G01S 5/0063* (2013.01); *G01S 5/021* (2013.01); *H04L 5/0048* (2013.01); *H04W 24/10* (2013.01); *G01S 2205/008* (2013.01)

(58) Field of Classification Search

CPC ..... H04L 5/0048; H04L 5/001; H04L 5/0035; H04L 5/0092; H04L 5/0094; H04L 5/005; H04W 24/10; H04W 64/00

See application file for complete search history.

(56) References Cited

U.S. PATENT DOCUMENTS

| | | | | |
|---|---|---|---|---|
| 2006/0009235 A1* | 1/2006 | Sheynblat | G01S 5/0036 | 455/456.1 |
| 2012/0122478 A1* | 5/2012 | Siomina | H04W 64/00 | 455/456.1 |
| 2012/0314604 A1* | 12/2012 | Siomina | H04W 64/00 | 370/252 |

(Continued)

FOREIGN PATENT DOCUMENTS

| | | |
|---|---|---|
| CN | 102823308 A | 12/2012 |
| CN | 114503706 A | 5/2022 |

(Continued)

OTHER PUBLICATIONS

Extended Search Report issued for European Patent Application No. 22950732.2 dated Sep. 5, 2025 (14 pages).

(Continued)

*Primary Examiner* — Benjamin H Elliott, IV

(74) *Attorney, Agent, or Firm* — Foley & Lardner LLP

(57) ABSTRACT

The present disclosure is directed to positioning with carrier phase, including a method for positioning, performed by a user equipment (UE), by receiving configuration information of a reference signal for positioning from a network, performing a measurement on the reference signal for the positioning, and reporting a measurement result of the reference signal for the positioning.

19 Claims, 8 Drawing Sheets

(56) References Cited

U.S. PATENT DOCUMENTS

| | | | | |
|---|---|---|---|---|
| 2016/0291128 | A1* | 10/2016 | Persson | H04W 4/70 |
| 2017/0201898 | A1* | 7/2017 | Park | H04W 16/32 |
| 2020/0408871 | A1* | 12/2020 | Da | G01S 5/0072 |
| 2021/0109188 | A1* | 4/2021 | Kumar | G01S 5/0205 |
| 2021/0306895 | A1* | 9/2021 | Chen | G01S 5/0236 |
| 2022/0015058 | A1* | 1/2022 | Li | G01S 5/0236 |
| 2022/0022158 | A1* | 1/2022 | Zarifi | H04L 5/0048 |
| 2022/0082652 | A1* | 3/2022 | Da | H04L 5/005 |
| 2023/0046045 | A1* | 2/2023 | Bao | H04W 64/006 |
| 2023/0180172 | A1* | 6/2023 | Zhang | G01S 5/02<br>455/456.1 |
| 2023/0284177 | A1* | 9/2023 | Zhou | H04W 64/003<br>455/456.1 |
| 2023/0345261 | A1* | 10/2023 | Li | H04W 16/28 |
| 2023/0408627 | A1* | 12/2023 | Bao | G01S 5/0236 |
| 2025/0130305 | A1* | 4/2025 | Peng | G01S 5/02 |

FOREIGN PATENT DOCUMENTS

| | | | |
|---|---|---|---|
| KR | 1020100087393 | A | 8/2010 |
| WO | WO-2010/138039 | A1 | 12/2010 |
| WO | WO-2022/126088 | A1 | 6/2022 |

OTHER PUBLICATIONS

Moderator (CATT): "FL Summary #2 for improved accuracy based on NR carrier phase measurement", 3GPP Draft; R1-2205165, 3rd Generation Partnership Project (3GPP), Mobile Competence Centre; 650, Route Des Lucioles; F-06921 Sophia-Antipolis Cedex; France, vol. RAN WG1, No. e-meeting; May 9, 2022-May 20, 2022 May 21, 2022, XP052203995.

Ericsson, "On Rel. 15 NR positioning measurements", 3GPP TSG RAN1 Meeting #90Bis, R1-1718691, Oct. 13, 2017, Prague, Czech Republic (4 pages).

International Search Report and Written Opinion for PCT Appl. No. PCT/CN2022/106068 mailed Dec. 21, 2022, (9 pages).

* cited by examiner

POSITIONING WITH CARRIER PHASE

CROSS-REFERENCE TO RELATED APPLICATION

This application claims the benefit of priority under 35 U.S.C. § 120 as a continuation of PCT Patent Application No. PCT/CN2022/106068, filed on Jul. 15, 2022, the disclosure of which is incorporated herein by reference in its entirety.

TECHNICAL FIELD

The disclosure relates generally to wireless communications and, more particularly, to systems, methods, and non-transitory computer-readable media for positioning with carrier phase.

BACKGROUND

Demands on accuracy of positioning are rising. For example, in a parking structure, locating a vehicle or object in the parking structure is difficult. The difficulty can increase where the parking structure is underground or positioning is desired at time of peak usage of a communication system. Existing systems may not be sufficiently accurate, and can be made worse in urban environments or high-use scenarios.

SUMMARY

The example arrangements relate to positioning with carrier phase. In some arrangements, a user equipment can perform s method including receiving configuration information of a reference signal for positioning from a network, performing a measurement on the reference signal for the positioning, and reporting a measurement result of the reference signal for the positioning.

The measurement can include a carrier phase of the reference signal for the positioning measured in a frequency domain on a direct current (DC) sub-carrier. The report can include a specific phase that is assumed at the transmission side when reporting the measurement result of a carrier phase. The reporting can include a positioning reference unit configured to broadcast a calibration of one or more of a carrier phase and a differential value of the carrier phase. The calibration can include calibration information for multiple transmission and reception points (TRP), where one TRP is set as a reference point or a reference TRP.

The method can include forwarding, from a positioning reference unit (PRU) to the UE, the carrier phase can include an original value of the carrier phase. The method can include broadcasting, to the UE, a report can include information of a PRU. The method can include broadcasting, by the PRU, a report can include the measurement result. The method can include performing the measurement can include a differential value between a plurality of carrier phases for two neighboring antennas. The reporting can include reporting one or more of a wavelength of a radio wave, a frequency, and an absolute radio frequency channel number (ARFCN) when the measurement result of one or more carrier phases are reported. The reporting can include reporting a virtual wavelength when the measurement result of the differential value of the carrier phases is reported. The reporting can include reporting an antenna spacing when the measurement result of the carrier phases are reported.

The method can include applying a previous value of antenna spacing in response to a determination that an antenna spacing is absent or not reported. The method can include applying a default value of antenna spacing in response to a determination that the antenna spacing is absent or not reported. The reporting can include reporting a value $\lambda\cdot\Phi$ when the measurement result of the carrier phases is reported. The x an angle ($\theta$) or the $\sin(\theta)$ or the ratio $\lambda\cdot\Phi/(2\cdot\pi\cdot d)$ or $\Phi/d$ when the measurement result of the carrier phases is reported.

The reporting can include reporting, when a measurement result(s) of carrier phases are with an unit of wavelength, a ratio $\Phi/(2\cdot\pi\cdot d)$ or $\Phi/d$ when the measurement result of the carrier phases is reported. The method can include measuring one or more carrier phases or differential value of the carrier phases for two or more group of antennas. The reporting can include the carrier phase of a sub-carrier is reported with sub-carrier index, wherein the sub-carrier including direct current sub-carrier. The reporting can include reporting an angular measurement with a carrier phase or a differential carrier phase from multiple reference signal resources on different time instances. The reporting can include indicating a range of an integer when a UE reports a carrier phase or a differential value of one or more carrier phases. The configuration information can configure a UE with a range of the integer N by a network. The configuration information can include a configuration or a report of the range of the integer at a level of per PRS resource. The configuration information can include a configuration or a report of the range of the integer with an uncertainty. The integer N can include a positioning calculation end that determines the range of the integer based on time of arrival of the reference signal. The integer N can include a cycle slip indicated by the UE when the carrier phase or the differential value of carrier phases is reported.

In some arrangements, a base station can perform a method including configuring a reference signal for positioning, performing a measurement on the reference signal for the positioning, and reporting a measurement result of the reference signal for the positioning. The reporting can include reporting the measurement result of carrier phase(s) of Sounding Reference Signal (SRS) from UE's antenna ports with coherency. The reporting can include reporting the measurement result of carrier phase(s) of SRS from UE's antenna ports with coherency under "partially coherent" attribution is reported. The reporting can include reporting the measurement result of carrier phase(s) of SRS from UE's antenna ports with coherency is reported with antenna port index with coherency attribution.

In some arrangements, a location management function controller (LMF) can perform a method including requesting one or more network elements for calibration, receiving a measurement result from the network elements, and performing a positioning related operation for the network elements, can include calibration. The positioning related operation can include selecting, by the LMF, the measurement result for forwarding to a UE to position itself. The calibration can include broadcasting, by the LMF, positioning related information of a PRU. The positioning related operation can include configuring, by the LMF, one or more of a UE and a base station with a range of one or more integers for searching. The positioning related operation can include determining, by the LMF, the range of the integer based on a time of arrival of the reference signal.

The above and other aspects and their arrangements are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings may not be considered limiting of the breadth, scope, or applicability of the present solution. It can be noted that for clarity and ease of illustration, these drawings are not necessarily drawn to scale.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
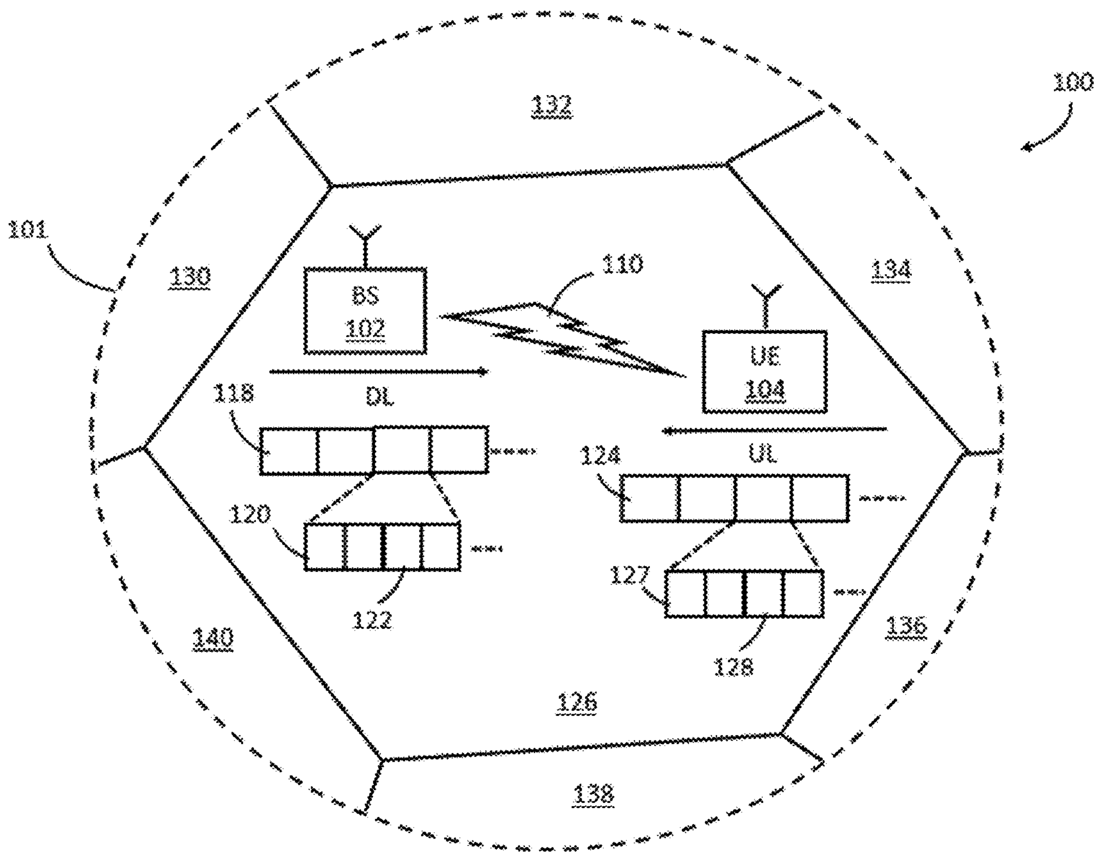
FIG. 1 illustrates an example wireless communication network, and/or system, in which techniques disclosed herein may be implemented, in accordance with some arrangements.

FIG. 1 illustrates an example wireless communication network, and/or system, 100 in which techniques disclosed herein may be implemented, in accordance with an arrangement of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (also referred to as wireless communication node) and a UE device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the base station 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the base station 102 and UE 104 are described herein as non-limiting examples of "communication nodes," generally, which can practice the methods disclosed herein. Such communication nodes may be capable of wireless and/or wired communications, in accordance with various arrangements of the present solution.

Figure 2:
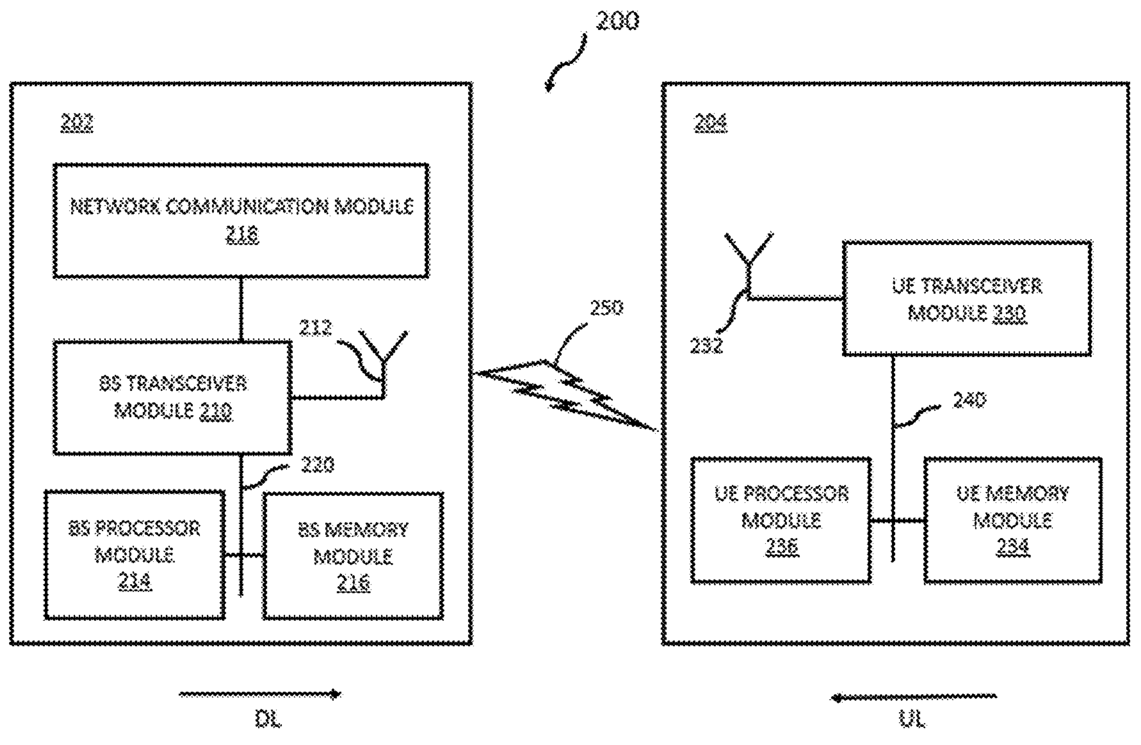
FIG. 2 illustrates a block diagram of an example wireless communication system for transmitting and receiving wireless communication signals in accordance with some arrangements.

FIG. 2 illustrates a block diagram of an example wireless communication system 200 for transmitting and receiving wireless communication signals (e.g., OFDM/OFDMA signals) in accordance with some arrangements of the present disclosure. The system 200 may include components and elements configured to support known or conventional operating features that need not be described in detail herein. In one illustrative arrangement, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions may not be interpreted as limiting the scope of the present disclosure.

In accordance with some arrangements, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some arrangements, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various arrangements, the BS 202 may be an evolved node B (eNB), gNB, a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3:
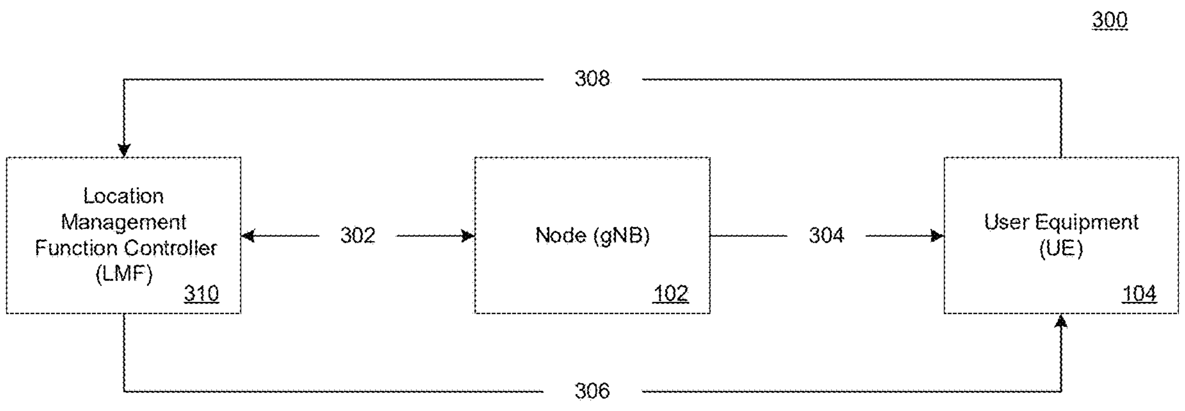
FIG. 3 is a diagram illustrating an example downlink configuration, according to various arrangements.

FIG. 3 is a diagram illustrating an example downlink configuration, according to various arrangements. As illustrated by way of example in FIG. 3, an example configuration 300 can include the base station node ("gNB" or "BS") 102, the user equipment (UE) 104, and a location management function controller (LMF) 310. The LMF 310 can communicate with the BS 102 by signaling 302, and the BS 102 can communication with the UE 104 by a positioning reference signal (PRS) 304. The LMF 310 can transmit a measurement request 306 to the UE 104, and can receive a measurement report 308 from the UE 104.

For example, in the downlink (DL) the PRS is transmitted by one or multiple gNB. TO achieve usable positioning accuracy, multiple gNB can be involved (e.g., three base stations). A UE can measure the PRS and report the measurement result to a network (e.g., a Location Management Function, LMF, in the Core Network, CN, 5G CN, 5GC). A network element can include one or more of gNB, CN and UE.

Figure 4:
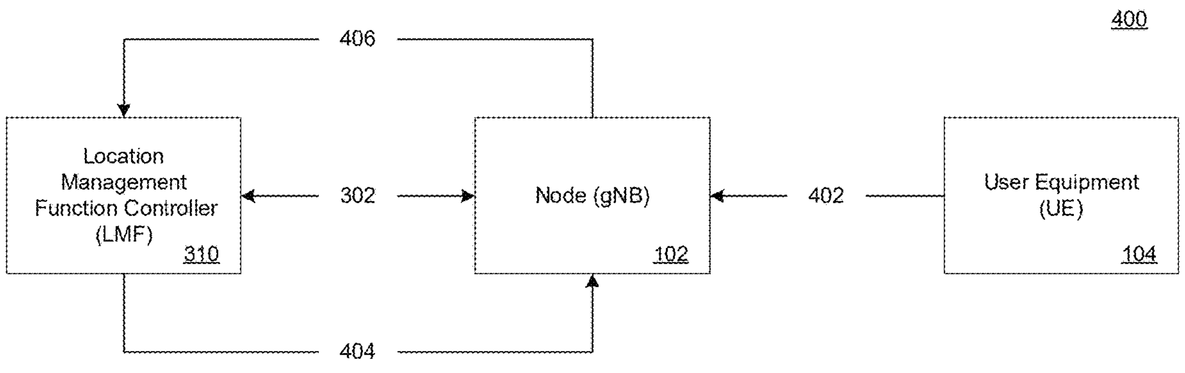
FIG. 4 is a diagram illustrating an example uplink configuration, according to various arrangements.

FIG. 4 is a diagram illustrating an example uplink configuration, according to various arrangements. As illustrated by way of example in FIG. 4, an example configuration 400 can include the base station node ("gNB" or "BS") 102, the user equipment (UE) 104, and the location management function controller (LMF) 310. The LMF 310 can communicate with the BS 102 by the signaling 302, and the BS 102 can communication with the UE 104 by a sounding reference signal (SRS) 402. The LMF 310 can transmit a measurement request 404 to the BS 102, and can receive a measurement report 406 from the BS 102.

For example, in the uplink (UL), the SRS is transmitted by one UE. One or multiple gNB can measure the SRS and report the measurement result to the network (e.g., LMF). The transmission of PRS and SRS for purpose of positioning can be affected by the radio propagation environment (e.g., fading, distortion). Hence, the positioning accuracy can be limited.

Figure 5:
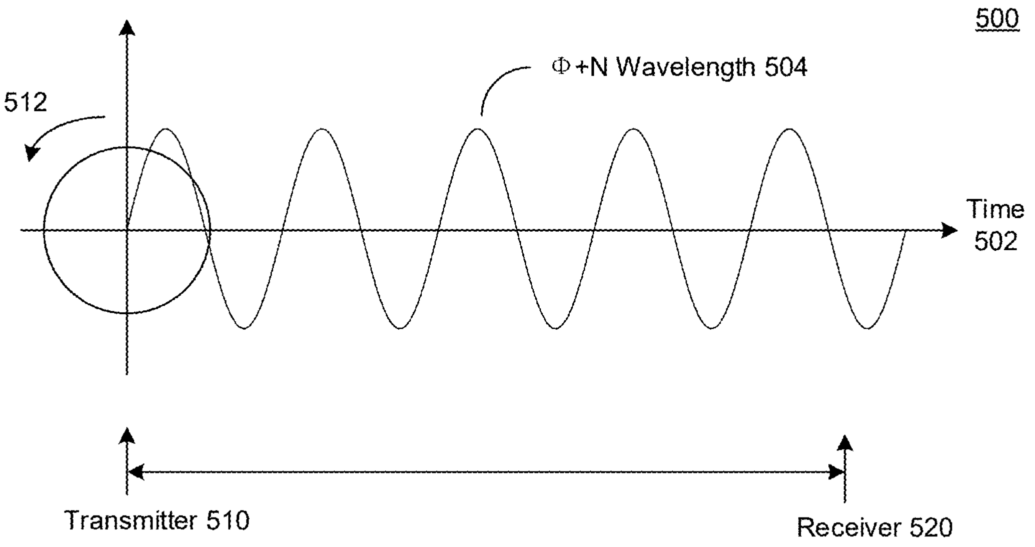
FIG. 5 is a diagram illustrating an example transmission architecture, according to various arrangements.

FIG. 5 is a diagram illustrating an example transmission architecture, according to various arrangements. As illustrated by way of example in FIG. 5, an example transmission architecture 500 can include a transmitter 510 and a receiver 520, that can correspond to one or more of the BS 102, the UE 104, the LMF 310, or any combination thereof. A transmission 512 from the transmitter 510 can have travel over time 502 with wavelength 504.

A radio wave can travel from a transmitter to a receiver with multiple wavelengths. For a full wavelength, the corresponding carrier phase (or, carrier phase difference between transmitter and receiver) can be 2π. For a fraction part of a wavelength, the corresponding carrier phase can be a value within (0, 2π). Where the carrier phase can be measured (and without noise interference, and an assumption of line of sight, LOS, between transmitter and receiver), then the distance between transmitter and receiver (D) is:

$$D=(\Phi+N)\cdot\lambda=(\Phi+N)\cdot c/f \quad \text{(Eqn. 1)}$$

For example, Φ is the fractional part of the measured carrier phase, N is the integer part of the measured carrier phase, λ is the wavelength of the radio wave transmitted by the transmitter, c is the velocity of light, f is the carrier frequency of the radio wave transmitted by the transmitter. Thus, a UE 104 can measure the carrier phase (e.g., Φ, N or Φ+N, where the N can be searched with some specific algorithm), and the distance between transmitter and receiver can be determined.

Figure 6:
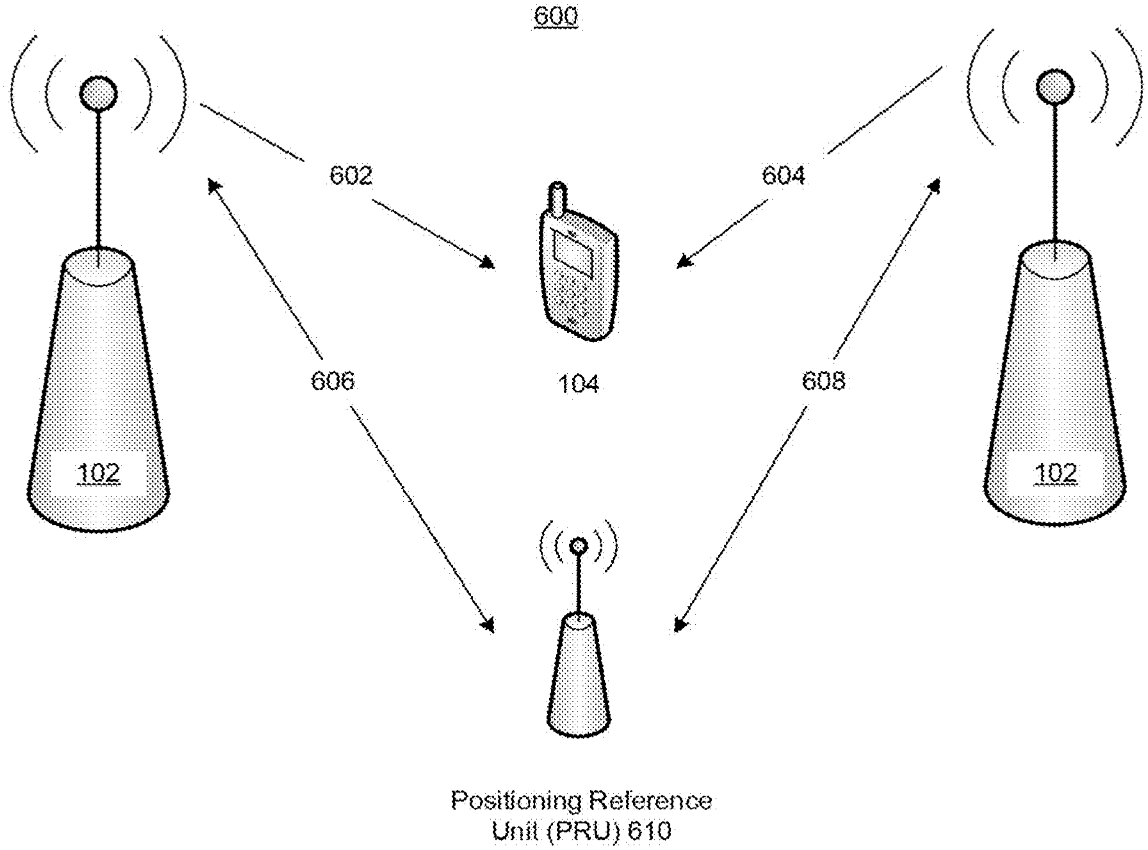
FIG. 6 is a diagram illustrating an example system, according to various arrangements.

FIG. 6 is a diagram illustrating an example system, according to various arrangements. As illustrated by way of example in FIG. 6, an example system 600 can include a first and second BS 102, the UE 104, and a positioning reference unit (PRU) 610. One or more of the BS 102 can communicate unidirectionally or bidirectionally with the UE 104, respectively by transmission paths 602 and 604. One or more of the BS 102 can communicate unidirectionally or bidirectionally with the PRU 610, respectively by transmission paths 606 and 608.

In some cases, a synchronization (SYNC) between gNB may be imprecise (e.g., there is no accurate clock being installed on them). An inaccurate SYNC may reduce the positioning performance. Present implementations can overcome this inaccuracy. A positioning reference unit (PRU) can be treated as a UE with known location (e.g., being fixed on a pole with many antennas). A PRU can receive/transmit signal from/to gNB. This example takes DL-PRS as description. However, its principle can also be applied to UL-SRS. For example, a PRU can be used for calibration. It can be noted that, some reduced capability UE (RedCap UE) can be treated as a PRU (e.g., a RedCap UE being used for wireless sensing, video supervision, etc) because they are fixed in some cases.

Secondly, the gNB can prepare a PRS transmission. Thirdly, the gNB can transmit the PRS. Fourthly, the gNB can respond to the LMF with a response to calibration. The response from gNB can include information on its PRS transmission (e.g., antenna spacing, carrier phase of PRS transmission). The response from the gNB can include measurement result(s) from UE.

Fifthly, a PRU can measure the PRS from gNB. The measurement result(s) may include a carrier phase of PRS (e.g., fractional part of carrier phase, the Φ in Equ. 1, the integer part N in Equ. 1) from one or more gNB (or TRP). In some cases, the carrier phase of PRS (e.g., fractional part of carrier phase, the Φ in Equ. 1) can be measured in a frequency domain. The carrier phase of a PRS can be measured in a frequency domain on a frequency center of the carrier that carries PRS. The carrier phase of a PRS can be measured in a frequency domain on a direct current (DC) sub-carrier. The carrier phase of PRS can be measured in a frequency domain on a sub-carrier with index 0. The carrier phase of PRS can be measured in a frequency domain on M (M>0, an integer, e.g., M=3, e.g., sub-carrier with index −1, 0, +1) sub-carriers around the sub-carrier with index 0. The carrier phase of PRS can be measured in a frequency domain after averaging on M (M>0, an integer, e.g., M=21, e.g., sub-carrier with index −10, −9, . . . , −1, 0, 1, . . . , +10) sub-carriers around the sub-carrier with index 0. For example, the carrier phase of PRS can be smoothed near the sub-carrier with index 0 (or, frequency center). The measurement result(s) can be averaged with multiple sample(s) (e.g., Q=4 samples). For example, the final measurement result of carrier phase of PRS can be averaged with Q=2 samples (i.e., 2 measurements).

Sixthly, a PRU can report the measurement result(s) to the network (e.g., LMF, can be via gNB). A PRU can report the measurement result(s) to gNB. With this report of carrier phase of PRS, the gNB can transmit PRS with the reported carrier phase at next PRS transmission. The gNB can transmit PRS with a negative value of the reported carrier phase at next PRS transmission (e.g., if Φ=0.1 were reported, then, the PRS can be transmitted with a −Φ=−0.1 at next PRS transmission). The carrier phase of PRS at the future transmission can be informed to PRU (or UE) beforehand. A carrier phase of reference signal at a transmission (e.g., at the future transmission) can be indicated (or reported) to a network element (e.g., a PRU, or UE, or a gNB, or a LMF). A PRU (or a UE) can report the measurement result(s) to the application layer (or higher layer). For example, for UE-based positioning, the measurement result(s) is/are reported to an application layer of location computation.

If a PRU (or a UE) measured the carrier phase of PRS with multiple antennas, the original carrier phases of PRS (without differential) on multiple antennas can be reported (e.g., P=4 carrier phases for P=4 antennas, fractional part, Φ). The differential of carrier phases on multiple antennas can be reported (e.g., P−1=3 differential carrier phases for P=4 antennas, one antenna being selected as base). The minimum value (e.g., in absolute value) of carrier phases on multiple antennas is reported. The maximum value of carrier phases on multiple antennas can be reported. The average value of carrier phases on multiple antennas can be reported. The carrier phases on their first arrival path on their antennas are reported.

The carrier phase on a segment of resource block (RB, e.g., on a RB with index 0) or on a range of frequency can be reported. The carrier phases on a segment of resource block (RB) or on a range of frequency on multiple antennas are reported.

Alternately, single differential value(s) of carrier phases can be reported. For example, a PRU (or UE) measures carrier phases of PRS from 2 gNB (or TRP), then a single differential value of carrier phases can be calculated and reported (e.g., Φ1-Φ2, where Φ1 and Φ2 come from 2 gNB). The PRS from different gNB (or TRP) have different identifications (e.g., TRP-ID, PRS resource ID). A resource ID (e.g., PRS resource ID) or antenna port or scrambling code can be used to identify different antenna.

Alternately, within one beam (or beam direction), the carrier phase of a resource group (of PRS) corresponding to the beam can be measured and reported. Alternately, one resource group (of PRS) can be mapped to multiple antenna of a beam. Each antenna can utilize one PRS resource. Alternately, one PRS resource can be mapped to one antenna. Alternately, one PRS resource can have a resource ID. A single differential value of carrier phases between carriers (or frequency layers, FL) can be calculated and reported. A specific phase (e.g., 0, π/2, π, 3π/2, on different FL or different transmission time) can be assumed at the transmission side when measuring/reporting measurement result(s) of carrier phase(s). A single differential value of carrier phases between sub-carriers can be calculated and reported. A sub-carrier index can be attached when reporting.

A PRU (or RSU, or UE) broadcasts calibration of carrier phases or differential value of carrier phases. For the calibration information within one TRP, one antenna element (e.g., the first element) can be selected as a reference point. For the calibration information for multiple TRP, one TRP (e.g., a TRP with minimum PRS resource ID) can be set as a reference point (or reference TRP). The calibration information can be location error (or coordinates error) between an announced location and the location computed by a PRU (or RSU). The calibration information can be differential value of carrier phases between an measured carrier phase and the carrier phase computed by a PRU (or RSU) with location information (or coordinates information). A carrier phase (measurement) report includes the information of the reference point (e.g., PRS resource ID).

Alternately, the carrier phase of a sub-carrier (including direct current, DC, sub-carrier) can be reported with sub-carrier index. Alternately, the carrier phase of a sub-carrier (including DC sub-carrier) can be reported with sub-carrier index, if it comes from the frequency domain.

Seventhly, the network (e.g., LMF) calculates the location of base station (e.g., gNB). Eighthly, the network (e.g., LMF) evaluate the possible error of the location of base station (e.g., gNB). After that, a modification on the location of base station can be generated for LMF for positioning. For the UE-based positioning or PRU-based positioning (e.g., for a later positioning procedure), the modification on the location of base station (or the updated location of base station) can be sent to UE (or gNB) by LMF.

The procedure herein can also be used for calibration of SYNC between gNB. For example, the LMF (or PRU, or UE) can determine whether two gNB are in SYNC if the carrier phases (or, differential of carrier phases) measured by a PRU can be higher than a threshold. This can be because the location of gNB and PRU are known. Hence, the carrier phases (or, differential of carrier phases) can also be known (after integer part N being resolved). It can be noted that, this may require multiple measurements. In practice, a PRU may not be too far away from the gNB (or TRP) being calibrated because the radio path might be blocked (e.g., a LOS path is blocked). For example, a PRU can be under the coverage of a gNB (e.g., with a high signal power to interference plus noise power ratio, SINR). That is, the LMF can choose a PRU that is close enough to the gNB (or TRP) being calibrated. It can be noted that, the procedure herein can also be used for calibration the location of a PRU (e.g., via request from LMF to a PRU). The LMF can trigger the calibration procedure above (e.g., via request to a PRU). Alternately, in some cases, an antenna reference point (ARP) (or a TRP) may not on its declared location (e.g., shifted by strong wind). For this case, the location of ARP can be calibrated by a PRU (e.g., via carrier phase measurement). A gNB (or TRP, or ARP) can report (or update) its location periodically. With this method, the transmission of a base station (or UE) can be calibrated with the assistance of PRU. Hence, the performance of positioning can be improved.

First, a UE can be positioned and a PRU measure carrier phases of PRS from the first gNB (i.e., gNB 1) at the same time for the same PRS resource. The measurement results (e.g., fractional part of carrier phase) are marked as $$\Phi_{UE}^{1} \text{ and } \Phi_{PRU}^{1}$$

from UE and PRU, respectively. Similarly, the $$\Phi_{UE}^{2} \text{ and } \Phi_{PRU}^{2}$$

for the second gNB (i.e., gNB 2) can also be measured. For example, the PRU can be used to assist in determining positioning of the UE. Secondly, the UE and PRU can report the measurement results $$(\Phi_{UE}^{1}, \Phi_{PRU}^{1}, \Phi_{UE}^{2}, \Phi_{PRU}^{2})$$

to a LMF.

Thirdly, a differential of carrier phases $$(\Phi_{UE}^{1} \text{ and } \Phi_{PRU}^{1})$$

for the same PRS resource (e.g., same TRP, or same gNB) can be obtained as $$\Delta\Phi^{1} = \Phi_{UE}^{1} - \Phi_{PRU}^{1}$$

in the LMF. With this differential, the clock drift (from gNB) can be removed (at a high extent, if not all). This differential value can be marked as single differential. Similarly, the differential of carrier phases for the second gNB can also be obtained as $$\Delta\Phi^2 = \Phi^2_{UE} - \Phi^2_{PRU}$$

in the LMF. With one or more single differential values, the LMF can calculate the location of the UE (after integer part N searching). Hence, with the help of PRU, the positioning performance can be improved (because the clock drift in UE/gNB is/are removed). A dual differential value can be generated as $\nabla\Delta\Phi^{12}=\Delta\Phi^1-\Delta\Phi^2$. The dual differential value can remove the clock drift (from UE) (at a high extent, if not all). The dual differential value can also be used for positioning. It can be noted that, for the UE-based positioning (with carrier phase or, carrier phase measurement), the LMF can forward the differential value (single and/or dual) to the UE which wants to position itself. The LMF can forward the original value of carrier phase from a PRU $$\left(\text{e.g., } \Phi^1_{PRU}, \Phi^2_{PRU}\right)$$

to the UE. The carrier phase from a PRU (e.g., $$\Phi^1_{PRU}, \Phi^2_{PRU}\right)$$

can be with an identification (ID) of PRS resource.

The LMF can select at least a part of measurement result(s) for forwarding to the UE which wants to position itself. For example, the LMF can select measurement result(s) with high LOS probability. For another example, the LMF can select measurement result(s) with low uncertainty. The LMF can forward the carrier phase value (including original value without differential, differential value, single and/or dual differential) to a cell (gNB). The LMF can forward the differential value (single and/or dual) to a center unit (CU) of a cell (gNB-CU). The LMF can forward the differential value (single and/or dual) to a distribution unit (DU) of a cell (gNB-DU). A gNB-CU can forward the carrier phase value to a gNB-DU. The LMF can forward the differential value (single and/or dual) to a cell (gNB) that serves the UE which wants to position itself. The LMF can forward the carrier phase value via assistant data.

The LMF (or gNB, gNB-CU, gNB-DU) can broadcast information of a PRU (e.g., the location of the PRU, the measurement result from PRU, the carrier phase value from PRU). The LMF (or gNB, gNB-CU, gNB-DU) can broadcast information of a PRU via system information block (e.g., posSIB). The information of a PRU (or RSU) can be broadcasted via side-link (SL, e.g., PC5 protocol). Alternately, (e.g., in an application of vehicle to anything communication, V2X), a PRU (or a road side unit, RSU, similar to a UE) can broadcast its measurement result(s).

Fourthly, for the UE-based positioning, the UE which wants to position itself calculates location of itself with the original value of carrier phase (without differential) and/or differential value (single and/or dual) from LMF. With this method, the UE-based positioning can be fulfilled with the assistance of PRU. Hence, the performance of positioning can be improved.

Figure 7:
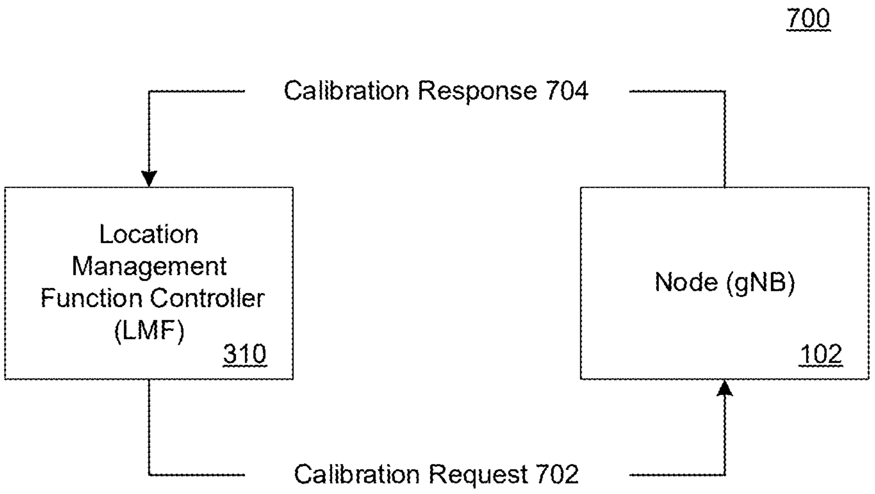
FIG. 7 is a diagram illustrating an example calibration architecture, according to various arrangements.

FIG. 7 is a diagram illustrating an example calibration architecture, according to various arrangements. As illustrated by way of example in FIG. 7, an example calibration architecture 700 can include the BS 102 and the LMF 310. The LMF 310 can transmit a calibration request 702 to the BS 102. The BS 102 can transmit a calibration response 704 to the LMF 310.

A SYNC between gNB and UE may be imprecise (e.g., there can be clock drift on UE). The inaccurate SYNC may damage the positioning performance. Present implementations can overcome this inaccuracy. A positioning reference unit (PRU) can be used for assistance of positioning for a UE. A PRU can be used to calibrate the transmission of gNB (and/or UE) (e.g., transmission time, transmission start time, transmission carrier phase, SYNC state between gNB, SYNC state between UE and gNB, SYNC state between PRU and gNB, etc). Before calibration, a PRU can register itself on a (core) network (e.g., its UE capability, actual location, etc). First, a network (e.g., a LMF) send a request to gNB for calibration as the following figure. In addition, a network (e.g., a LMF) may send a request to a PRU for measuring/reporting measurement result(s) of PRS from one or more gNB. The location of gNB (or transmission and reception point, TRP, or TRP of gNB) can be included in the request to a PRU.

Figure 8:
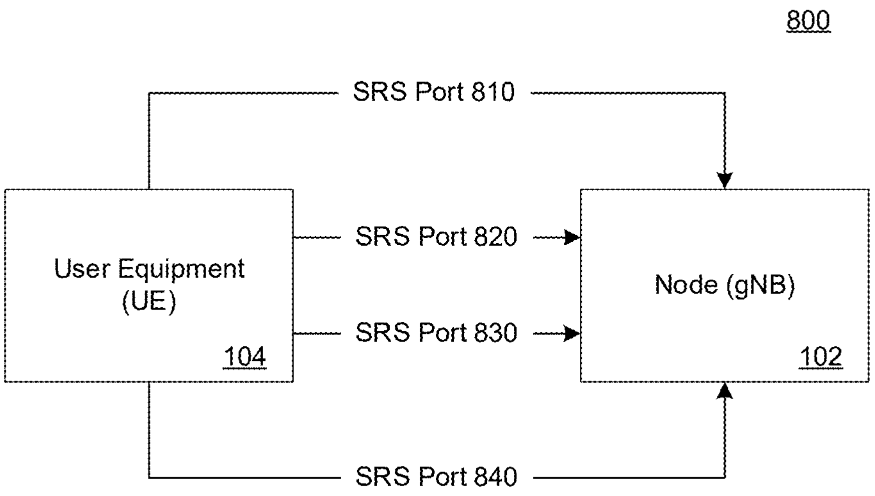
FIG. 8 is a diagram illustrating an example port architecture, according to various arrangements.

FIG. 8 is a diagram illustrating an example port architecture, according to various arrangements. As illustrated by way of example in FIG. 8, an example port architecture 800 can include the BS 102 and the UE 104. The UE 104 can communication with the BS 102 by one or more SRS ports 810, 820, 830 and 840.

A UE may have several antennas (or, antenna ports). Different antenna (or, antenna ports) can transmit different SRS signal (e.g., with different SRS resource or, different SRS resource set or, different SRS resource ID or, different SRS resource set ID). A positioning reference unit (PRU) can be used for assistance of positioning for a BS. SRS with multiple antennas can be used for positioning for a UE. In this case, a LMF can compute the location of UE.

First, a network (e.g., a gNB) configures the SRS resources (or, SRS resources set) for a UE to be positioned. These SRS resources can be SRS for channel state information measurement (e.g., SRS for multiple input and multiple output, SRS for MIMO) or, just for positioning. Each SRS resource can be associated with one antenna (or, antenna port, or port). Each antenna port has an index (e.g., port index 0, 1, 2, 3 on the figure above). These antenna ports can be coherent, partially coherent or non-coherent between each other. The coherency between any two antennas (or antenna ports) can be indicated by UE (e.g., via UE capability signaling). Before configuring SRS resources for a UE, a gNB can be requested by the network (e.g., a LMF) to configure SRS resources for this UE.

Secondly, the UE can transmit SRS on one or more antennas (or antenna ports). The UE transmits SRS on one or more antennas (or antenna ports) with coherency. The UE transmits SRS on one or more antennas (or antenna ports) with coherency while the antenna (or, antenna port) without coherency pauses transmitting SRS. The UE transmits SRS on one or more antennas (or antenna ports) with coherency while the antenna (or, antenna port) without coherency may not transmit SRS during positioning.

Thirdly, a gNB (or a TRP of a gNB, or a PRU, or a RSU) measures SRS from UE. The gNB measures carrier phase of SRS from UE. The gNB measures SRS from UE's antenna (or antenna ports) with coherency. The gNB measures carrier phase of SRS from UE's antenna (or antenna ports)

with coherency. The gNB does not measure SRS from UE's antenna (or antenna ports) without coherency. The gNB does not measure carrier phase of SRS from UE's antenna (or antenna ports) without coherency. Fourthly, the gNB (or a TRP of a gNB, or a PRU, or a RSU) can report the measurement result(s) of SRS from UE to LMF. The measurement result(s) of SRS from UE's antenna (or antenna ports) with coherency can be reported. The measurement result(s) of carrier phase(s) of SRS from UE's antenna (or antenna ports) with coherency can be reported. The measurement result(s) of SRS from UE's antenna (or antenna ports) without coherency can be blocked or eliminated from reporting. For example, if antenna port 0 and 3 are with coherency while antenna port 1 and 2 have no coherency (relative to antenna port 0), then only the the measurement results of SRS from UE's port 0 and 3 are reported.

The measurement result(s) of SRS from UE's antenna (or antenna ports) with coherency under "partially coherent" attribution can be reported. The measurement result(s) of carrier phase(s) of SRS from UE's antenna (or antenna ports) with coherency under "partially coherent" attribution can be reported. The measurement result(s) of SRS from the UE antenna (or antenna ports) without coherency under "partially coherent" attribution may not be reported. For example, if antenna port 0 and 1 are in the first group and they have coherency and, if antenna port 2 and 3 are in second group and they have partially coherency relative to the first group while the antenna port 2 has coherency relative to the antenna port 0 and the antenna port 3 has no coherency relative to the antenna port 0, then, only the measurement result(s) of SRS from UE's antenna port 0, 1, 2 are reported. The measurement result(s) of SRS from UE's antenna (or antenna ports) under "non-coherent" attribution can be blocked or eliminated from reporting.

The measurement result(s) of SRS from UE's antenna (or antenna ports) can be reported with antenna index (or antenna ports index). The measurement result(s) of SRS from UE's antenna (or antenna ports) can be reported with antenna index (or antenna ports index) with coherency attribution (e.g., "coherent", "partially coherent" or "non-coherent"). The measurement result(s) of carrier phase(s) of SRS from UE's antenna (or antenna ports) can be reported with antenna index (or antenna ports index) with coherency attribution. Alternately, if different antenna (or antenna port) transmit different carrier (or FL), then a receiver can concatenate the measurement results with coherency from these coherent carriers (or FL) together. It is equivalent that the bandwidth for positioning is increased. Hence, the measurement results are more precise. Fifthly, a LMF calculates location of the UE. With this method, the SRS from UE can be correctly processed with coherency. Hence, the performance of positioning can be improved.

Figure 9:
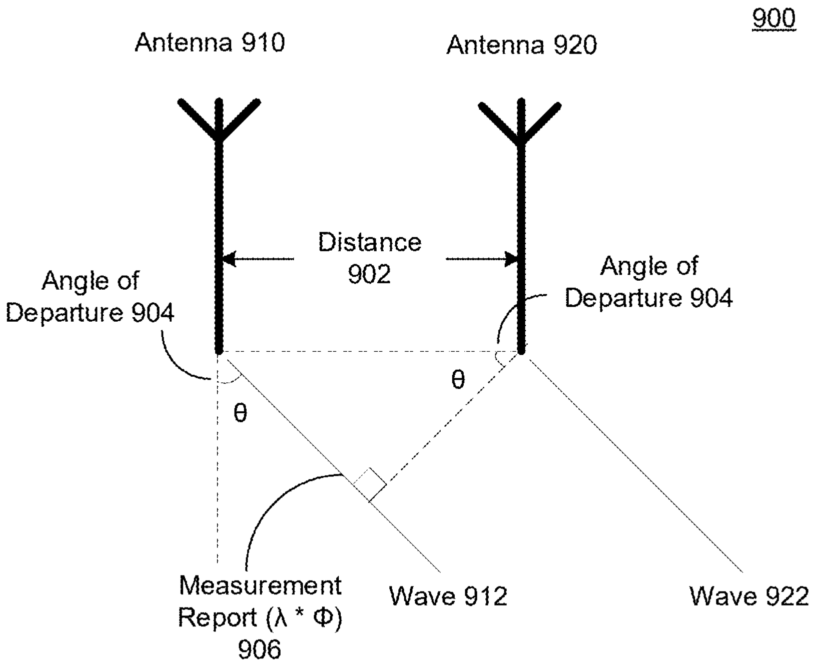
FIG. 9 is a diagram illustrating an example positioning architecture, according to various arrangements.

FIG. 9 is a diagram illustrating an example positioning architecture, according to various arrangements. As illustrated by way of example in FIG. 9, an example positioning architecture 900 can include antenna 910 and antenna 920 located at a distance 902 from each other. The antenna 910 can transmit or receive the wave 912 at an angle of departure 904, and the antenna 920 can transmit or receive the wave 922 at the angle of departure 904. The measurement report 906 can be based on one or more of the distance 902, the angle of departure 904, the wave 912, and the wave 922. Angular measurement can be important for positioning (e.g., to figure out which direction of an interference comes from). However, the current positioning accuracy is not high enough. It is hopefully improved to an accuracy of sub-degree with carrier phase (or, with carrier phase measurement).

Present implementations can compute an angle of arrival radio wave (AOA). It can be noted that, it can also be used for the computation of angle of departure radio wave (AOD). The AOA/AOD (i.e., θ, unit in radians, in a range of −π/2~π/2) can be computed as the following equation.

$$\theta = \arcsin\left(\lambda \cdot \Phi/(2 \cdot \pi \cdot d)\right) \quad \text{(Eqn. 2)}$$

For example, arcsin( ) is the inverse sine function, λ is the wavelength of radio wave with an unit of meter, Φ is the differential value of carrier phases between two neighboring antennas, the Φ is with an unit of radians and its range is −π~+π (note: a negative value means that the radio wave arrives later on antenna 2 than on antenna 1), the d is antenna spacing with an unit of meter (e.g., with a value of λ/2).

Where sin(θ)≤1, λ*Φ can be less than or equal to d. For a large antenna spacing (e.g., for 4 antennas, the antenna spacing between the first antenna and the fourth antenna can be 3d=1.5λ), the Equ. 2 can be distorted because the differential value of carrier phases between these two antennas (i.e., the Φ) can be within the range of −π~+π. For this reason, the antenna spacing d can be defined for neighboring two antennas and, the differential value of carrier phases can also be defined for neighboring two antennas.

A UE (or a PRU, or a RSU, or a gNB, or a TRP of gNB) measures (and/or reports) the differential value of carrier phases for neighboring two antennas. For antenna on display (AOD) or angle of arrival (AOA), a UE measures (and/or reports) Q−1 differential values of carrier phases for every two neighboring antennas where Q is the number of antennas (e.g., Q transmission antennas for AOD, or Q reception antennas for AOA). A UE (or a PRU, or a RSU, or a gNB, or a TRP of gNB) measures (and/or reports) the differential value of carrier phases for the closest two antennas. A UE (or a PRU, or a RSU, or a gNB, or a TRP of gNB) measures (and/or reports) the differential value of carrier phases for the closest two antennas in distance. For the differential value of carrier phases (i.e., the Φ) reporting, a granularity of 0.001~0.1 radians can be applied (e.g., with S=10 bits). For the differential value of carrier phases (i.e., the Φ) reporting, a granularity of 0.01~0.1 degree can be applied (e.g., with W=9 bits).

The wavelength of radio wave (λ) or frequency (f=c/λ) or absolute radio frequency channel number (ARFCN) can also be reported when the measurement result(s) of carrier phases are reported. This is because a gNB may transmit multiple frequencies (or FL/carriers) while a UE can receive multiple frequencies (or FL/carriers). A virtual wavelength $\lambda_V=c/(f_1-f_2)$ can also be reported when the measurement result(s) of the differential value of carrier phases (i.e., $\Delta\Phi=\Phi_1-\Phi_2$) can be reported. A virtual wavelength is helpful for a fast search of integer part N. Another virtual wavelength $\lambda_W=2c/(f_1+f_2)$ can also be reported when the measurement result(s) of the average value of carrier phases (i.e., $\Delta\Phi=(\Phi_1+\Phi_2)/2$) can be reported. This virtual wavelength is helpful for wipe measurement noise out.

The antenna spacing (i.e., d) can also be reported when the measurement result(s) of carrier phases are reported. This is because different UE may have different implementation (e.g., different support of frequency band). The antenna spacing (i.e., d) can be reported only once. Alternately, if the antenna spacing (i.e., d) can be absent (i.e., not reported), then the previous value can be applied. Alternately, if the antenna spacing (i.e., d) is absent, a default value (e.g., $d=\lambda/2$) can be applied. The antenna spacing (including horizon antenna spacing, vertical antenna spacing, antenna spacing between panels, antenna spacing between groups, antenna spacing within a group) of gNB (or TRP of gNB, or UE) can be informed in system information block (SIB).

The value $\lambda\cdot\Phi$ can also be reported when the measurement result(s) of carrier phases are reported. For the value $\lambda\cdot\Phi$ reporting, a granularity of 0.01~0.1 can be applied (e.g., with T=7 bits). The value $\lambda\cdot\Phi$ can be reported if the antenna spacing (i.e., d) is not available (e.g., for AOD measurement, the gNB or LMF does not send the antenna spacing to UE).

The AOA/AOD (i.e., $\theta$) or the $\sin(\theta)$ or the ratio $\lambda\cdot\Phi/(2\cdot\pi\cdot d)$ or $\Phi/d$ can also be reported when the measurement result(s) of carrier phases are reported. For the AOA/AOD (i.e., $\theta$) reporting, a granularity of 0.1~1 degree can be applied. For the $\sin(\theta)$ or the ratio $\lambda\cdot\Phi/(2\cdot\pi\cdot d)$ or $\Phi/d$ reporting, a granularity of 0.001~0.1 can be applied (e.g., with R=10 bits). Alternately, in some cases, the measurement result(s) of carrier phases are with an unit of wavelength ($\lambda$). For this case, the ratio $\Phi/(2\cdot\pi\cdot d)$ or/d can also be reported when the measurement result(s) of carrier phases are reported. A UE (or a PRU, or a RSU, or a gNB, or a TRP of gNB) measures (and/or reports) the carrier phases (or the differential value of carrier phases) for two or more group of antennas. For polarized antenna, a UE measures (and/or reports) the carrier phases (or the differential value of carrier phases) for two or more group of antennas. For polarized antenna, a UE measures (and/or reports) the carrier phases (or the differential value of carrier phases) for two or more group of antennas with antenna spacing. Each group of antennas (or panel of antennas) can be associated with a resource set. Each antenna element (or antenna port) can be mapped with a resource (of a resource set). Each antenna element (or antenna port) can be mapped with a PRS resource (of a PRS resource set).

In some cases, when a UE can be near a gNB, the AOA/AOD measurement might be affected by beamforming from the gNB (or TRP of gNB). For this case, the beam direction can also be reported when a UE reports AOA/AOD measurement result(s). The beam direction can also be reported when a UE reports AOA/AOD measurement result(s) with carrier phases. The beam direction can also be reported when a UE reports AOA/AOD measurement result(s) with the differential value of carrier phases. A position end (e.g., a LMF) can be corrected the AOA/AOD measurement result(s) with the help of beam direction. The beam index can also be reported when a UE reports AOA/AOD measurement result(s). The beam index can also be reported when a UE reports AOA/AOD measurement result(s) with carrier phases. The beam index can also be reported when a UE reports AOA/AOD measurement result(s) with the differential value of carrier phases. A UE measures (and reports) the beam direction with carrier phases (or with differential value of carrier phases). A UE measures (and reports) the beam index with carrier phases (or with differential value of carrier phases) measurement. This can calibrate the direction of beamforming (or carrier phase center).

In some cases, a LMF can send an expected AOA/AOD to UE (and/or gNB) (e.g., 20 degree). A UE (and/or gNB) can report the AOA/AOD within the range of the expected AOA/AOD. A UE can report the AOA/AOD with an uncertainty (e.g., 5 degree). For a report of ratio $\Phi/(2\cdot\pi\cdot d)$ or $\Phi/d$, a UE can report the ratio $\Phi/(2\cdot\pi\cdot d)$ or $\Phi/d$ with an uncertainty (e.g., 0.1). For a report of carrier phases (or the differential value of carrier phases), a UE can report the carrier phases (or the differential value of carrier phases) with an uncertainty (e.g., 0.05). For a report of product $\lambda\cdot\Phi$, a UE can report the product $\lambda\cdot\Phi$ with an uncertainty (e.g., 0.1). For a AOA measurement/report by gNB (or TRP of gNB), a gNB can report the ratio $\lambda\cdot\Phi/(2\cdot\pi\cdot d)$ or $\lambda\cdot\Phi/d$ or $\Phi/d$. For a AOA measurement at gNB, a gNB can report the angle (i.e., $\theta$) to LMF. For a AOA measurement at gNB, a gNB can report the angle (i.e., $\theta$) that can be averaged over multiple antennas. For a AOA measurement at gNB, a gNB can report the angle (i.e., $\theta$) with an attribution of "carrier phase based" or "differential carrier phase based". For the UE-based positioning, a UE can report the AOA/AOD with $\theta=tg^{-1}(y-y_0)/(x-x_0))$ for azimuth angle and $\alpha=tg^{-1}(z-z_0)/\sqrt{(x-x_0)^2+(y-y_0)^2})$ for zenith angle, wherein the (x,y,z) are the coordinates of UE which are computed by UE with carrier phase (or differential carrier phase), and $(x_0, y_0, z_0)$ are the coordinates of gNB, the $tg^{-1}(\ )$ can be the inverse tangent. A UE measures (and/or reports) direction cosine relative to a gNB (or TRP of gNB) as $(\cos\alpha, \cos\beta, \cos\gamma)$, where $$\cos\alpha = (x-x_0)/\sqrt{(x-x_0)^2+(y-y_0)^2+(z-z_0)^2}, \quad \text{(Eqn. 3)}$$

$$\cos\beta = (y-y_0)/\sqrt{(x-x_0)^2+(y-y_0)^2+(z-z_0)^2}, \text{ and} \quad \text{(Eqn. 4)}$$

$$\cos\gamma = (z-z_0)/\sqrt{(x-x_0)^2+(y-y_0)^2+(z-z_0)^2}. \quad \text{(Eqn. 5)}$$

When a UE reports the direction cosine, a coordinate system can be indicated (or assumed, e.g., with fixed earth system, the earth center being as the original point). This method is helpful for a UE (on a car) that requires contiguous tracking with position system. A network (e.g., gNB, LMF) can broadcast some calibration factors (or calibration values related to carrier phase or carrier phase measurement). For example, geography correction factor, NLOS correction factor, transmission power correction factor, receiving power correction factor, angle correction factor. A receiver (e.g., gNB, UE) can measure (and report) angular measurement with carrier phase or differential carrier phase from multiple reference signal resources on different time instances. For example, there are four resources on the first time slot (numbered from 0 to 3) and four resources on the second time slot (numbered from 4 to 7), then a UE can measure (and report) AOD measurement result with differential carrier phase between reference signal resource #0 and #5 (i.e., $\Delta\Phi=\Phi_0-\Phi_5$). A resource ID (e.g., #0 and #5) can be indicated when the AOD measurement result is reported. With this method, the UE-based positioning can be fulfilled with the assistance of PRU. Hence, the performance of positioning can be improved.

Figure 10:
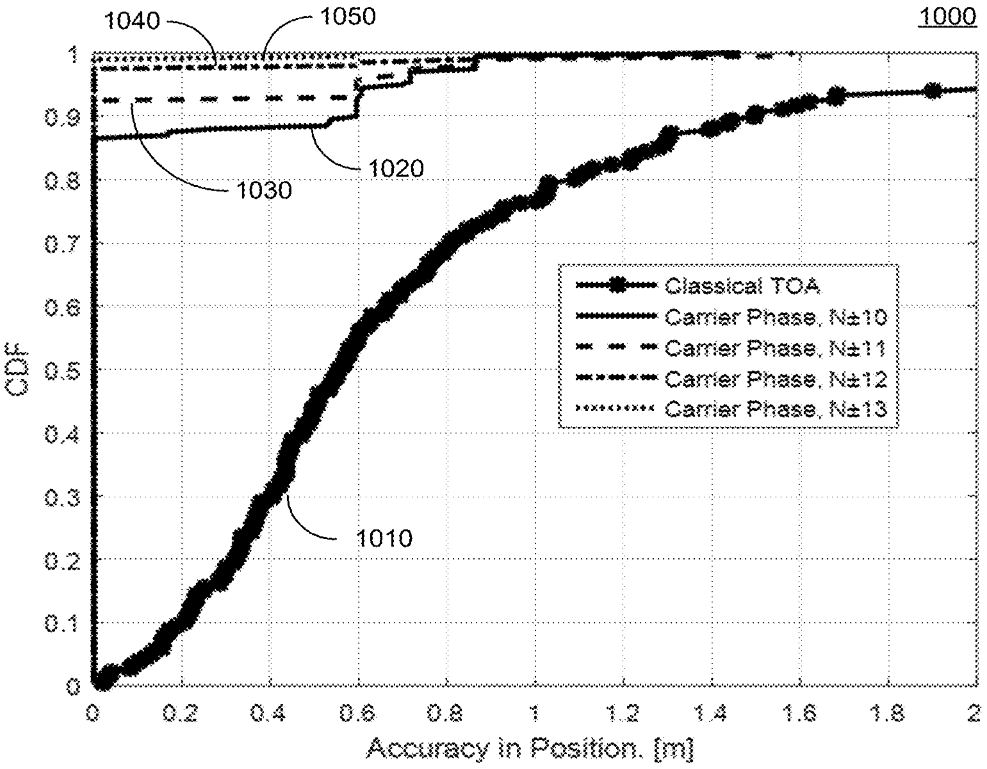
FIG. 10 is a diagram illustrating an example positioning accuracy performance, according to various arrangements.

FIG. 10 is a diagram illustrating an example positioning accuracy performance, according to various arrangements. As illustrated by way of example in FIG. 10, an example performance 1000 can include a TOA performance 1010, a first carrier phase performance 1020, a second carrier phase performance 1030, a third carrier phase performance 1040, and a fourth carrier phase performance 1050.

As expressed by way of example in Eqn. 1, the integer part N can be estimated to determine the distance between base station and UE. However, it is hard to be "measured". It is usually searched with a group of equation like Eqn. 1. A UE can provide (or report) a range of the integer N when it reports carrier phase or the differential value of carrier phases. For example, N=50±10 (i.e., 40~60). With this recommended range of the integer, a positioning calculation end (e.g., LMF) can figure out the correct integer N quickly (e.g., a LMF may not search N=0~39 and N>60, hence, the searching time can be short). A quick positioning calculation is helpful for realtime positioning (e.g., car driving, navigation). The LMF can configure a UE (or a gNB) with a range of the integer N. A LMF can configure a UE (or a gNB) with a range of the integer N when it calculates UE location with carrier phase or the differential value of carrier phases. This range of the integer is helpful for UE based positioning when searching the integer N. A network can configure a UE (or a gNB) with a range of the integer N. A network (e.g., eNB or LMF) can configure a UE (or a gNB) with a range of the integer N via SIB.

Alternately, this configuration (or report) of range of the integer can be at a level of per PRS resource. Alternately, this configuration (or report) of range of the integer can be at a level of per SRS resource. Alternately, this configuration (or recommendation) of range of the integer can be at a level of per TRP. Alternately, this configuration (or recommendation) of range of the integer can be at a level of per antenna reference point (ARP). Alternately, this configuration (or suggestion) of range of the integer can be at a level of per timing error group (TEG). A gNB (or TRP of gNB) can provide (or report) a range of the integer N when it reports carrier phase of SRS or the differential value of carrier phases of SRS. The configured (or provided) range of the integer can be with an uncertainty (e.g., ±2). For example, a positioning calculation end (e.g., LMF, UE) determines the range of the integer based on time of arrival (TOA). For example, $N=\pm 10+c\cdot TOA/\lambda$. For example, a positioning calculation end (e.g., LMF, UE) determines the range of the integer based on time differential of arrival (TDOA). For example, $\Delta N=N_1-N_2=\pm 3+c\cdot(TOA_1-TOA_2)/\lambda$. For example, a positioning calculation end (e.g., LMF, UE) determines the range of the integer based on reference signal receiving power (RSRP), AOA, AOD. The determined the range of the integer can be with an uncertainty (e.g., ±3). A cycle slip can be indicated by UE (or gNB) when the carrier phase or the differential value of carrier phases can be reported. A cycle slip can indicate that the integer part for two consequent measurements are not contiguous (i.e., without relationship).

An integer searching can have 2 steps. First, a virtual wavelength $\lambda_V=c/(f_1-f_2)$ and its corresponding differential value of carrier phases (i.e., $\Delta\Phi=\Phi_1-\Phi_2$) are used to find coarse integer $\Delta N=N_1-N_2$ (or, coarse location of UE). Secondly, a fine integer searching can be performed with carrier phase or another virtual wavelength $\lambda_W=2c/(f_1+f_2)$ and its corresponding carrier phases (i.e., $\Delta\Phi=(\Phi_1+\Phi_2)/2$) to find fine integer $M=(N_1+N_2)/2$. With ΔN and M, the integer of $N_1$ and $N_2$ can be determined. Hence, the location of UE can be calculated.

This configuration (or report) of range of the integer, different positioning performance can be achieved. From the following figure, it can be observed that, when the scope of integer is larger than N±11, the positioning performance may not grow much while the computation complexity can grow rapidly (e.g., at a speed of 2^(T+1), e.g., for T=5 base stations for positioning, the computation complexity growth speed is 2^6=64, i.e., 64 times of complexity). The distance between UE and base station can be precisely computed. Hence, the performance of positioning can be improved.

Figure 11:
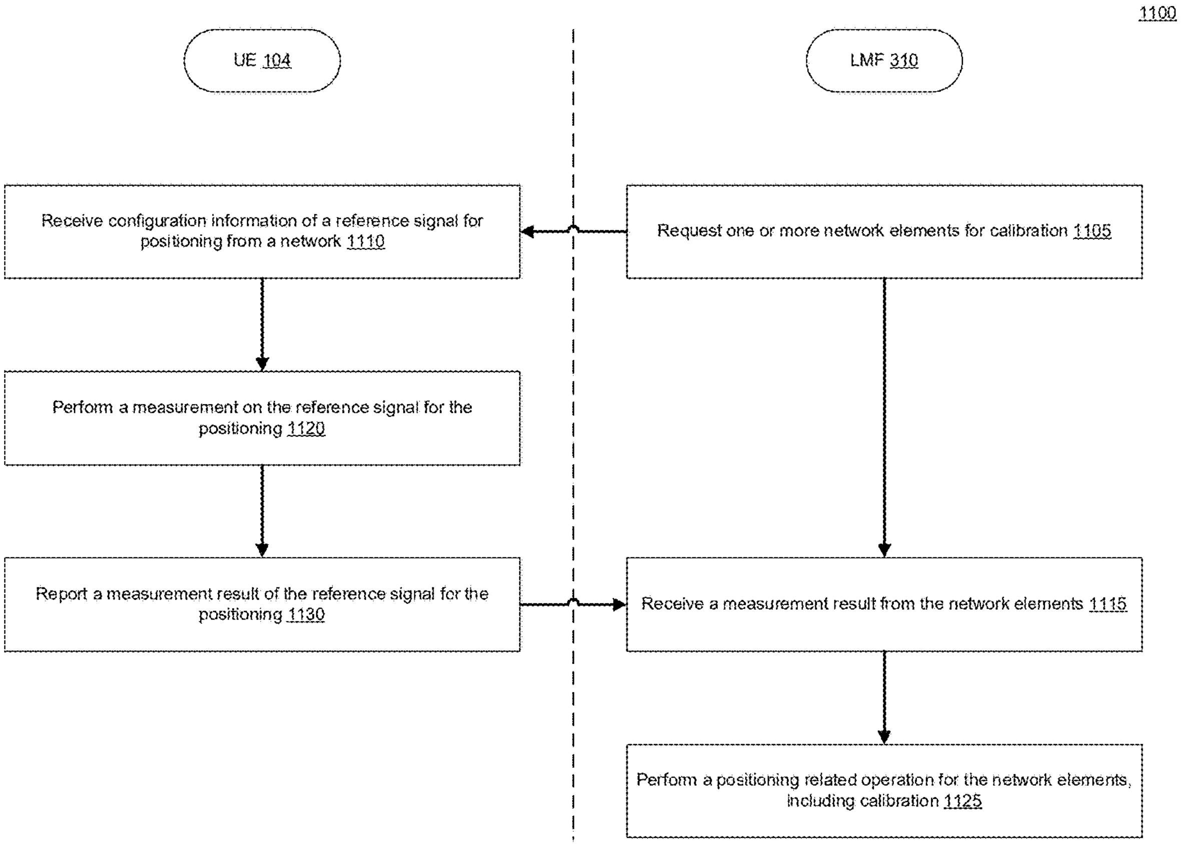
FIG. 11 is a diagram illustrating an example method for positioning with carrier phase, according to various arrangements.

FIG. 11 is a diagram illustrating an example method for positioning with carrier phase, according to various arrangements. At least one of the example systems 100 and 200 can perform method 1100 according to present implementations. The method 1100 can begin at 1105.

At 1105, the method can request one or more network elements for calibration. The method 1100 can then continue to one or more of 1110 and 1115. At 1110, the method can receive configuration information of a reference signal for positioning from a network. The method 1100 can then continue to 1120. At 1120, the method can perform a measurement on the reference signal for the positioning. The method 1100 can then continue to 1130. At 1130, the method can report a measurement result of the reference signal for the positioning. The method 1100 can then continue to 1115. At 1115, the method can receive a measurement result from the network elements. The method 1100 can then continue to 1125. At 1125, the method can perform a positioning related operation for the network elements, including calibration. The method 1100 can end at 1125.

Figure 12:
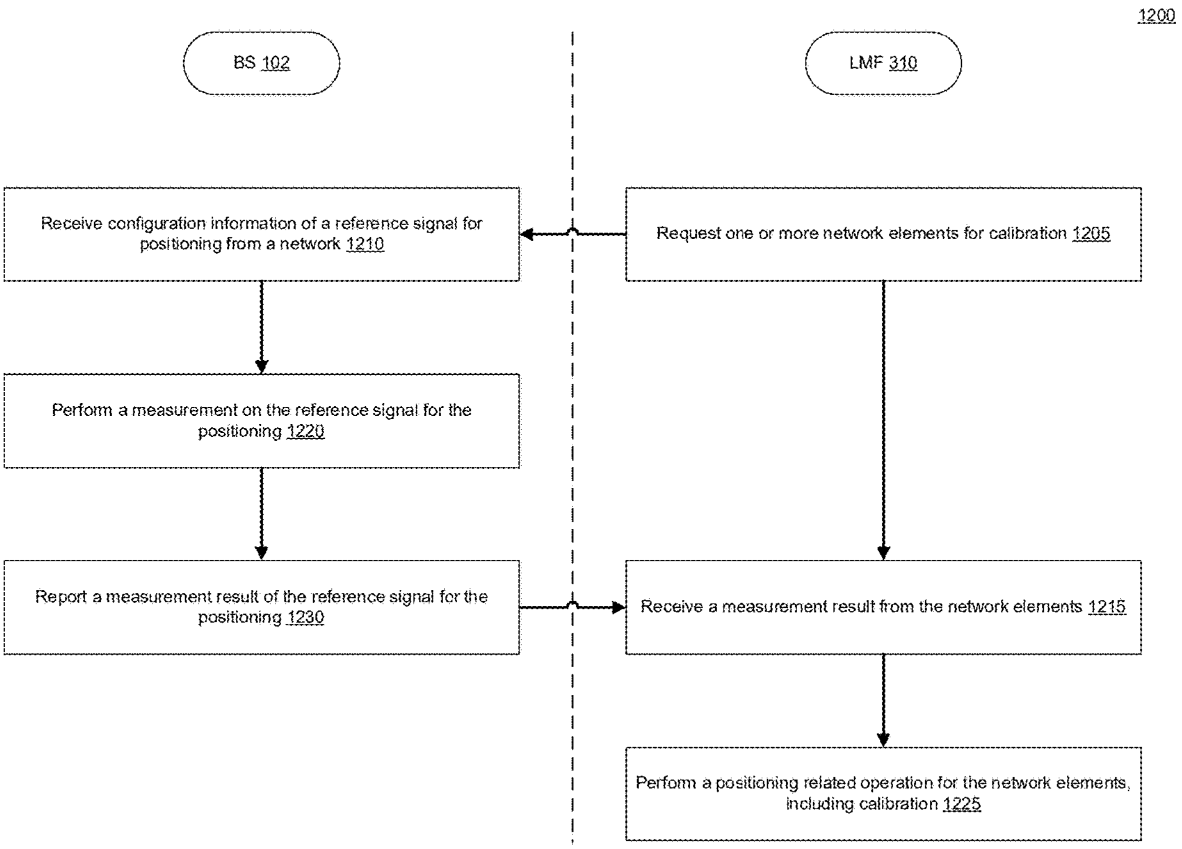
FIG. 12 is a diagram illustrating an example method for positioning with carrier phase, according to various arrangements.

FIG. 12 is a diagram illustrating an example method for positioning with carrier phase, according to various arrangements. At least one of the example systems 100 and 200 can perform method 1200 according to present implementations. The method 1200 can begin at 1205.

At 1205, the method can request one or more network elements for calibration. The method 1200 can then continue to one or more of 1210 and 1215. At 1210, the method can receive configuration information of a reference signal for positioning from a network. The method 1200 can then continue to 1220. At 1220, the method can perform a measurement on the reference signal for the positioning. The method 1200 can then continue to 1230. At 1230, the method can report a measurement result of the reference signal for the positioning. The method 1200 can then continue to 1215. At 1215, the method can receive a measurement result from the network elements. The method 1200 can then continue to 1225. At 1225, the method can perform a positioning related operation for the network elements, including calibration. The method 1200 can end at 1225.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the arrangements described in this disclosure will be readily apparent to those skilled in the art, and the general principles defined herein can be applied to other arrangements without departing from the scope of this disclosure. Thus, the disclosure is not intended to be limited to the arrangements shown herein, but is to be accorded the widest scope consistent with the novel features and principles disclosed herein, as recited in the claims below.

What is claimed is:

1. A method for positioning, performed by a user equipment (UE), the method comprising:

receiving configuration information of a reference signal for positioning from a network;

performing a measurement on the reference signal for the positioning; and reporting a measurement result of the reference signal for the positioning, the measurement including a carrier phase of the reference signal for the positioning measured in a frequency domain on a direct current (DC) sub-carrier.

2. The method according to claim 1, the report including a specific phase that is assumed at the transmission side when reporting the measurement result of a carrier phase.

3. The method according to claim 1, the reporting including a positioning reference unit configured to broadcast a calibration of one or more of a carrier phase and a differential value of the carrier phase.

4. The method according to claim 3, the calibration including calibration information for multiple transmission and reception points (TRP), wherein one TRP is set as a reference point or a reference TRP.

5. The method according to claim 2, further comprising:

forwarding, from a positioning reference unit (PRU) to the UE, the carrier phase including an original value of the carrier phase.

6. The method according to claim 1, further comprising:

broadcasting, to the UE, a report including information of a PRU.

7. The method according to claim 1, further comprising:

broadcasting, by a PRU, a report including the measurement result.

8. The method according to claim 1, further comprising:

performing the measurement including a differential value between a plurality of carrier phases for two neighboring antennas.

9. The method according to claim 1, the reporting including reporting one or more of a wavelength of a radio wave, a frequency, and an absolute radio frequency channel number (ARFCN) when the measurement result of one or more carrier phases are reported.

10. The method according to claim 9, the reporting including reporting a virtual wavelength when the measurement result of a differential value of the carrier phases is reported.

11. The method according to claim 9, the reporting including reporting an antenna spacing when the measurement result of the carrier phases are reported.

12. The method according to claim 11, further comprising:

applying a previous value of antenna spacing in response to a determination that an antenna spacing is absent or not reported.

13. The method according to claim 11, further comprising:

applying a default value of antenna spacing in response to a determination that the antenna spacing is absent or not reported.

14. The method according to claim 9, the reporting including reporting a wavelength multiplied by differential value of carrier phases value when the measurement result of the carrier phases is reported.

15. The method according to claim 9, the reporting including reporting an angle (θ) or the sin(θ) or a ratio or wavelength divided by antenna spacing when the measurement result of the carrier phases is reported.

16. The method according to claim 9, the reporting including reporting, when a measurement result(s) of carrier phases are with a unit of wavelength, a ratio or wavelength divided by antenna spacing when the measurement result of the carrier phases is reported.

17. The method according to claim 1, further comprising:

measuring one or more carrier phases or differential value of the carrier phases for two or more group of antennas.

18. The method according to claim 1, the reporting including: the carrier phase of a sub-carrier is reported with sub-carrier index, wherein the sub-carrier including direct current sub-carrier.

19. A method for positioning, performed by a base station, comprising:

configuring a reference signal for positioning;

performing a measurement on the reference signal for the positioning; and reporting a measurement result of the reference signal for the positioning, the measurement including a carrier phase of the reference signal for the positioning measured in a frequency domain on a direct current (DC) sub-carrier.

* * * * *